(12) United States Patent
Sekita (10) Patent No.: US 7,262,924 B2
(45) Date of Patent: Aug. 28, 2007

(54) OPTICAL SYSTEM AND IMAGE PICKUP APPARATUS INCLUDING THE SAME

(75) Inventor: Makoto Sekita, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/466,172

(22) Filed: Aug. 22, 2006

(65) Prior Publication Data

US 2007/0053061 A1 Mar. 8, 2007

(30) Foreign Application Priority Data

Sep. 2, 2005 (JP) ............................. 2005-255117

(51) Int. Cl.
*G02B 3/02* (2006.01)
*G02B 1/06* (2006.01)
*G02B 9/00* (2006.01)

(52) U.S. Cl. ..................... 359/708; 359/665; 359/653; 359/796

(58) Field of Classification Search ................ 359/665, 359/652, 653, 708, 718, 717, 796, 689
See application file for complete search history.

(56) References Cited

U.S. PATENT DOCUMENTS 5,638,215 A 6/1997 Neil 5,731,907 A 3/1998 Sigler
6,819,499 B2 * 11/2004 Watanabe ................... 359/689

FOREIGN PATENT DOCUMENTS

| JP | 61-003110 A | 1/1986 |
|----|-------------|--------|
| JP | 63-027809 A | 2/1988 |
| JP | 06-324262 A | 11/1994 |
| JP | 06-331887 A | 12/1994 |
| JP | 2001-042212 A | 2/2001 |
| JP | 2002-006210 A | 1/2002 |
| JP | 2004-061519 A | 2/2004 |

* cited by examiner

*Primary Examiner*—Scott J. Sugarman
*Assistant Examiner*—Jack Dinh

(57) ABSTRACT

At least one exemplary embodiment is directed to an optical system which includes a compound optical element including a lens element and a resin layer having different optical characteristics and having an aspherical interface therebetween. When Rref is a reference radius of curvature of the interface within an effective diameter, L is a distance from a diaphragm, ndg and vdg are a refractive index and an Abbe number, respectively, of a material of the lens element at the d-line, and ndj and vdj are a refractive index and an Abbe number, respectively, of a material of the resin layer at the d-line, the following expressions are satisfied:

$-1.5 < Rref/L < -0.3$ one of $0.1 < |ndg-ndj|$ and $5 < |vdg-vdj|$.

18 Claims, 6 Drawing Sheets

OPTICAL SYSTEM AND IMAGE PICKUP APPARATUS INCLUDING THE SAME

BACKGROUND OF THE INVENTION

1. Field of the Invention

The present invention relates to an optical system and an image pickup apparatus including the optical system.

2. Description of the Related Art

Recently, image pickup apparatuses (e.g., cameras), such as video cameras and digital still cameras, using solid-state image pickup devices have become smaller with increased image quality. Accordingly, demand has increased for small, high-image-quality optical systems for use in such cameras.

In conventional structures, one method for reducing the size of an optical system, reduces the number of lenses included in the optical system.

However, if the number of lenses is reduced, it becomes difficult to correct aberrations like spherical aberration and coma aberration that affect monochromatic imaging performance. In addition, the kinds of glass materials that can be used are limited, and it can be extremely difficult to correct chromatic aberration.

In addition, when the number of lenses is reduced, the refractive power of each lens included in the optical system is relatively increased. Therefore, sensitivity, which is a change in the optical performance with respect to manufacturing errors, is increased and it can become necessary to increase the processing accuracy of each lens and the assembly accuracy of the optical system.

Accordingly, an optical system including an aspherical lens surface is commonly used in order to maintain good imaging performance even when the number of lenses is reduced.

On the other hand, optical systems in which cemented lenses with aspherical cemented surfaces are used to obtain high imaging performance and low sensitivity with a small number of lenses have been discussed (Japanese Patent Publication No. 4-5362, Japanese Patent Laid-Open No. 63-27809, Japanese Patent Laid-Open No. 2001-42212, Japanese Patent Laid-Open No. 2002-6210, and Japanese Patent Laid-Open No. 2004-61519).

However, when aspherical surfaces are used, even though aberrations that affect the monochromatic imaging performance can be corrected, chromatic aberrations, which are mainly affected by the selection of glass material, become difficult to correct.

A method for reducing the occurrence of the chromatic aberration by using an anomalous dispersion material as an optical material is known. In addition, optical systems including diffractive optical elements for correcting the chromatic aberration instead of using the anomalous dispersion material are also known (Japanese Patent Laid-Open Nos. 6-324262 and No. 6-331887).

In the diffractive optical elements, the absolute value of a numerical value corresponding to the Abbe number is generally small (around 3.45). The diffractive optical elements are characterized by being capable of largely changing the chromatic aberration while barely affecting the spherical aberration, the comma aberration, and astigmatism by only slightly changing the refractive power obtained by diffraction.

In addition, since the incident light is diffracted, the refractive power linearly varies with respect to the variation in the wavelength of the incident light. Accordingly, the wavelength characteristic of the chromatic aberration coefficient is completely linear.

Therefore, in an optical system including a diffractive optical element, when the total lens length is reduced to reduce the overall size of the optical system, it can become necessary to only correct the spherical aberration, the coma aberration, and the astigmatism. With regard to the chromatic aberration, it may not be necessary to consider the absolute value thereof as long as the glass materials and refractive powers of the lenses are optimally designed such that the wavelength characteristic of the chromatic aberration coefficient is linear. Thus, the optical system in which the total lens length is reduced can be obtained.

On the other hand, as an optical material having a chromatic-aberration-correcting function similar to the optical characteristics of the diffractive optical elements, a liquid material having relatively high dispersion and relatively anomalous dispersion characteristics is known. Recently, achromatic optical systems using such a material have been suggested (U.S. Pat. Nos. 5,731,907 and 5,638,215).

In addition, Japanese Patent Publication No. 4-5362 and Japanese Patent Laid-Open No. 63-27809 discuss the optical systems in which aspherical cemented surfaces are used to obtain high imaging performance and low sensitivity with a small number of lenses.

However, in each of the embodiments of the above-mentioned publications, the cemented surface is regarded as a single surface. Therefore, in order to carry out the embodiments, aspherical surfaces having exactly the same shapes as those described in the embodiments can be manufactured, and this can be difficult in view of both processing accuracy and complexity of manufacturing.

Japanese Patent Laid-Open No. 2001-42212 discusses a practical technique for cementing an aspherical surface and a spherical surface together in which an adhesive layer is taken into account.

However, in the cementing step, it can be necessary to center the aspherical surface and the spherical surface at the cementing portion in order to ensure the imaging performance. Therefore, the manufacturing process can be extremely difficult.

Japanese Patent Laid-Open Nos. 2002-6210 and 2004-61519 discuss a technique of laminating a resin layer on an aspherical surface of a lens composed of a glass material. Accordingly, the aspherical surface and a spherical surface can be substantially cemented together. However, this technique is designed for a pickup objective lens, and only the spherical aberration and the chromatic aberration with respect to two wavelengths are mainly corrected. Therefore, corrections of the field curvature and the chromatic aberration caused by white light, which can be necessary in imaging optical systems, are not provided.

The diffractive optical element provides a sufficient chromatic-aberration-correcting function as a method for correcting the chromatic aberration. However, the diffractive optical element also generates unnecessary diffracted light with diffraction orders other than that of the diffracted light used in practice. The unnecessary diffracted light functions as colored flare light that degrades the imaging performance. In order to reduce the unnecessary diffracted light, a so-called layered diffractive optical element in which a plurality of blaze diffraction gratings are laminated along an optical axis can be used.

Accordingly, the energy can be concentrated at the designed diffraction order and unnecessary diffracted light can be greatly reduced. However, when high-luminance objects are shot, flare is still generated because of the unnecessary diffracted light.

As a method for manufacturing the diffractive optical element, a method of forming the diffractive optical element composed of an ultraviolet curable resin by molding using a mold is known. However, according to this method, the sensitivity of diffraction efficiency of the diffractive optical element is extremely high. Therefore, a high-accuracy mold must be used and high molding accuracy is required.

The materials discussed in Japanese Patent Laid-Open Nos. 6-324262 and 6-331887 are liquid, and therefore a structure for sealing the liquid is required. In addition, the manufacturing process becomes difficult when the materials are used as optical materials.

In addition, characteristics including the refractive index, dispersion, etc., largely vary along with the temperature variation and the environment resistance is not sufficient. Furthermore, since an interface with air cannot be obtained, it is difficult to sufficiently correct the chromatic aberration.

SUMMARY OF THE INVENTION

At least one exemplary embodiment is directed to an optical system and an image pickup apparatus used in imaging systems of digital cameras, video cameras, and film cameras.

According to at least one exemplary embodiment of the present invention, an optical system includes a compound optical element including a lens element and a resin layer including optical characteristics different from optical characteristics of the lens element and provided on a surface of the lens element. An interface between the lens element and the resin layer can be aspherical, and when Rref is a reference radius of curvature of the interface within an effective diameter, L is a distance from a diaphragm, which determines an on-axis marginal ray, to the interface along an optical axis in a state in which a focal length of the overall optical system is at a minimum, ndg is a refractive index of a material of the lens element at the d-line, and ndj is a refractive index of a material of the resin layer at the d-line, the following expressions are satisfied:

$-1.5 < Rref/L < -0.3$ $0.1 < |ndg-ndj|.$

According to at least one other exemplary embodiment of the present invention, an optical system includes a compound optical element including a lens element and a resin layer including optical characteristics different from optical characteristics of the lens element and provided on a surface of the lens element. An interface between the lens element and the resin layer can be aspherical, and when Rref is a reference radius of curvature of the interface within an effective diameter, L is a distance from a diaphragm, which determines an on-axis marginal ray, to the interface along an optical axis in a state in which a focal length of the overall optical system is at a minimum, vdg is an Abbe number of a material of the lens element at the d-line, and vdj is an Abbe number of a material of the resin layer at the d-line, the following expressions are satisfied:

$-1.5 < Rref/L < -0.3$ $5 < |vdg-vdj|.$

Further features of the present invention will become apparent from the following description of exemplary embodiments with reference to the attached drawings.

DESCRIPTION OF THE EMBODIMENTS

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

Optical systems and image pickup apparatuses including the optical systems according to exemplary embodiments of the present invention will be described below.

Figure 1:
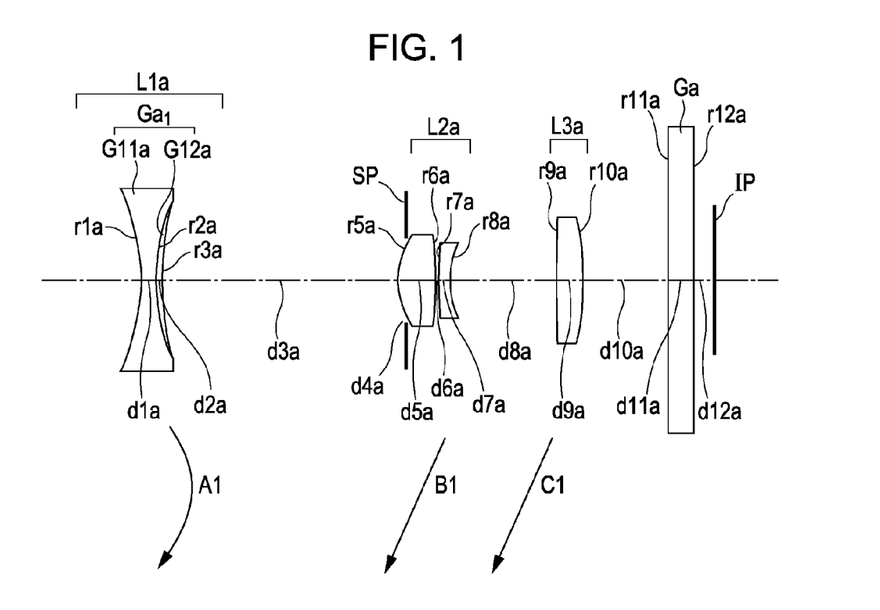
FIG. 1 illustrates a sectional view of an optical system according to a first exemplary embodiment of the present invention.
Figure 2:
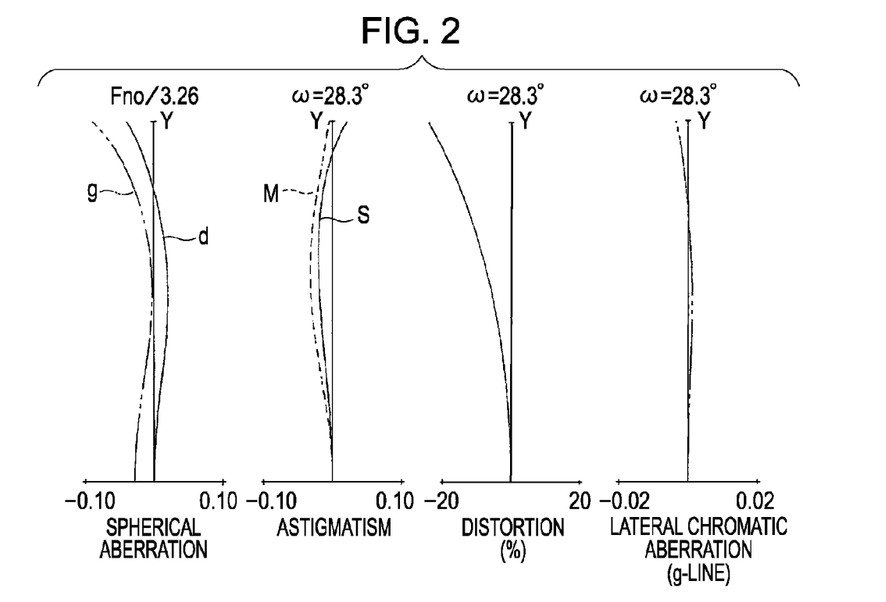
FIG. 2 illustrates an aberration diagram of the optical system according to the first exemplary embodiment at a wide-angle end.
Figure 3:
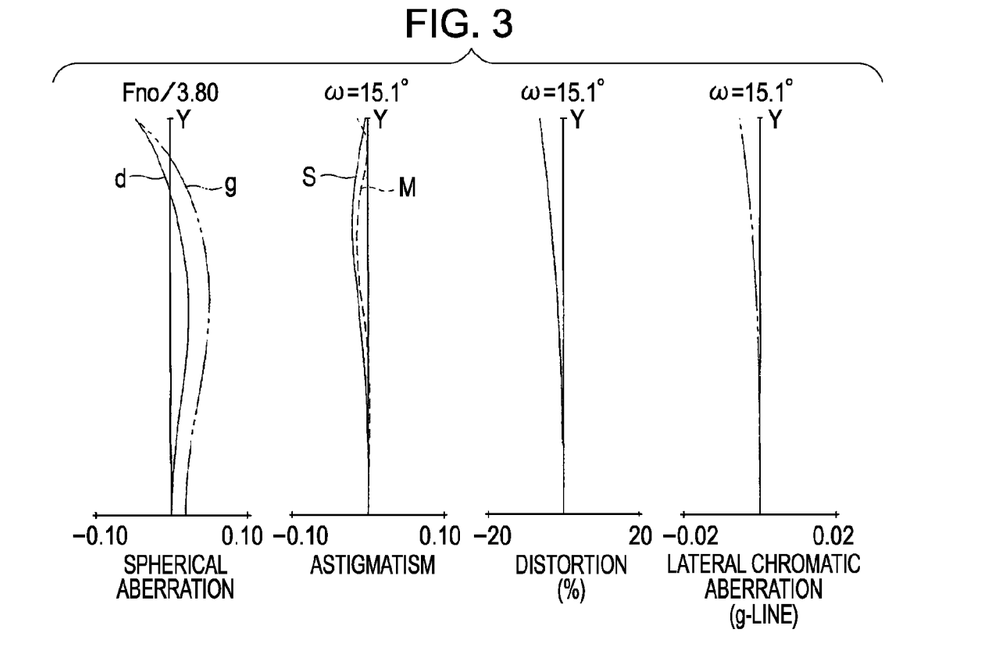
FIG. 3 illustrates an aberration diagram of the optical system according to the first exemplary embodiment at a middle zoom position.
Figure 4:
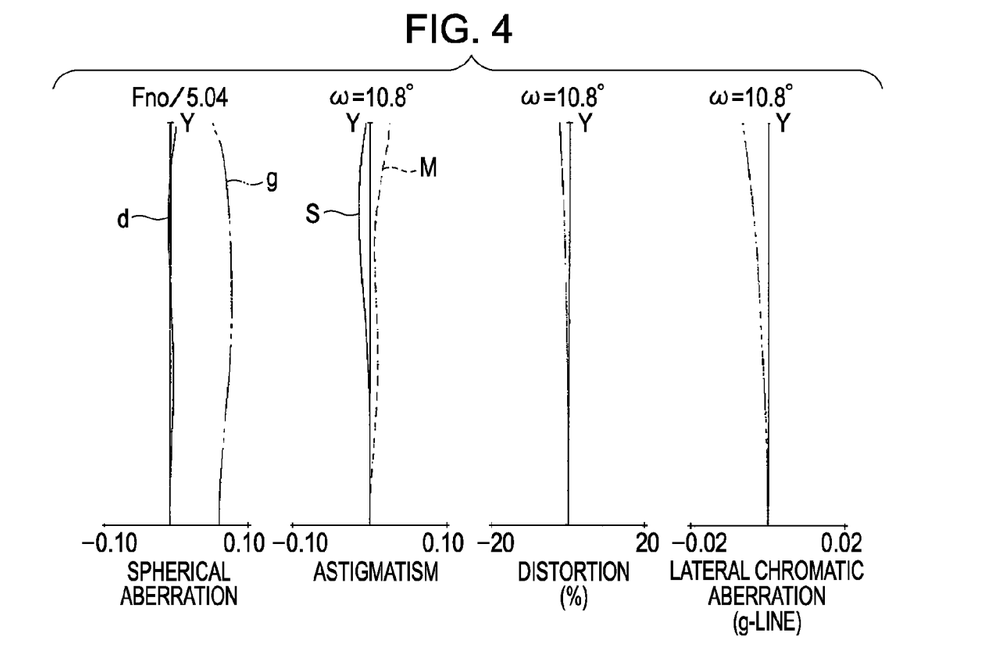
FIG. 4 illustrates an aberration diagram of the optical system according to the first exemplary embodiment at a telephoto end.

FIG. 1 illustrates a sectional view of an optical system according to a first exemplary embodiment of the present invention at a wide-angle end (short-focal-length end). In the first exemplary embodiment, the optical system is a zoom lens. FIGS. 2, 3, and 4 are aberration diagrams of the optical system according to the first exemplary embodiment at a wide-angle end, a middle zoom position, and a telephoto end (long-focal-length end), respectively.

Figure 5:
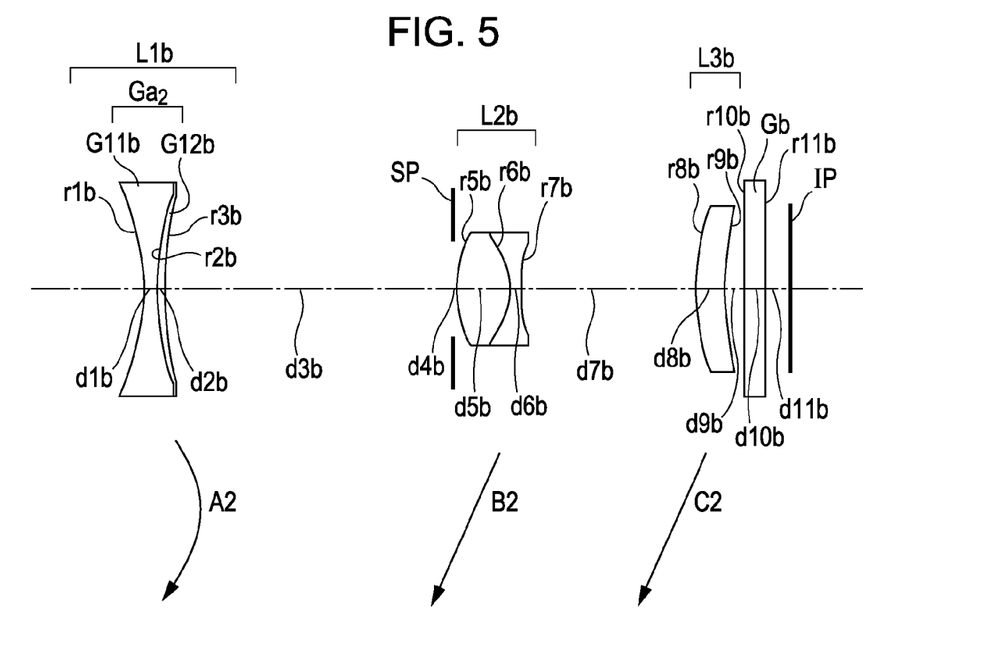
FIG. 5 illustrates a sectional view of an optical system according to a second exemplary embodiment of the present invention.
Figure 6:
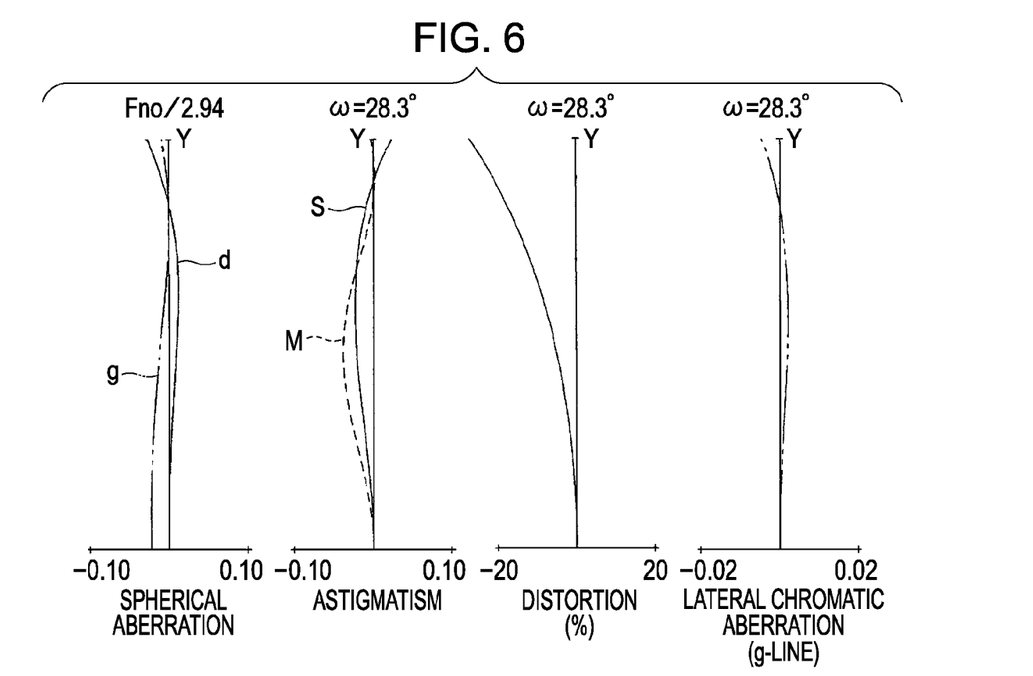
FIG. 6 illustrates an aberration diagram of the optical system according to the second exemplary embodiment at a wide-angle end.
Figure 7:
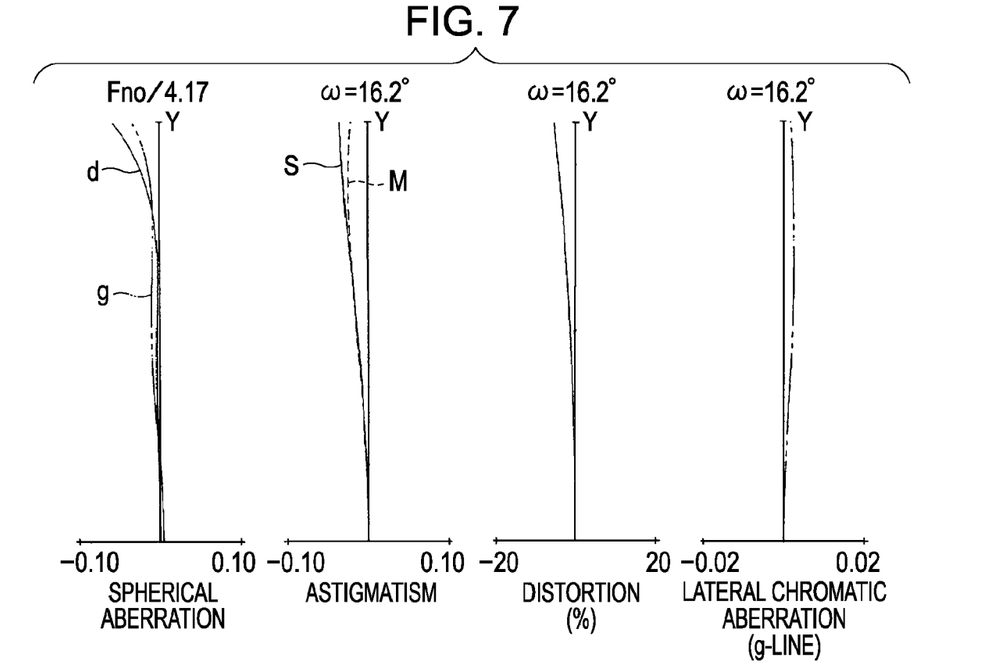
FIG. 7 illustrates an aberration diagram of the optical system according to the second exemplary embodiment at a middle zoom position.
Figure 8:
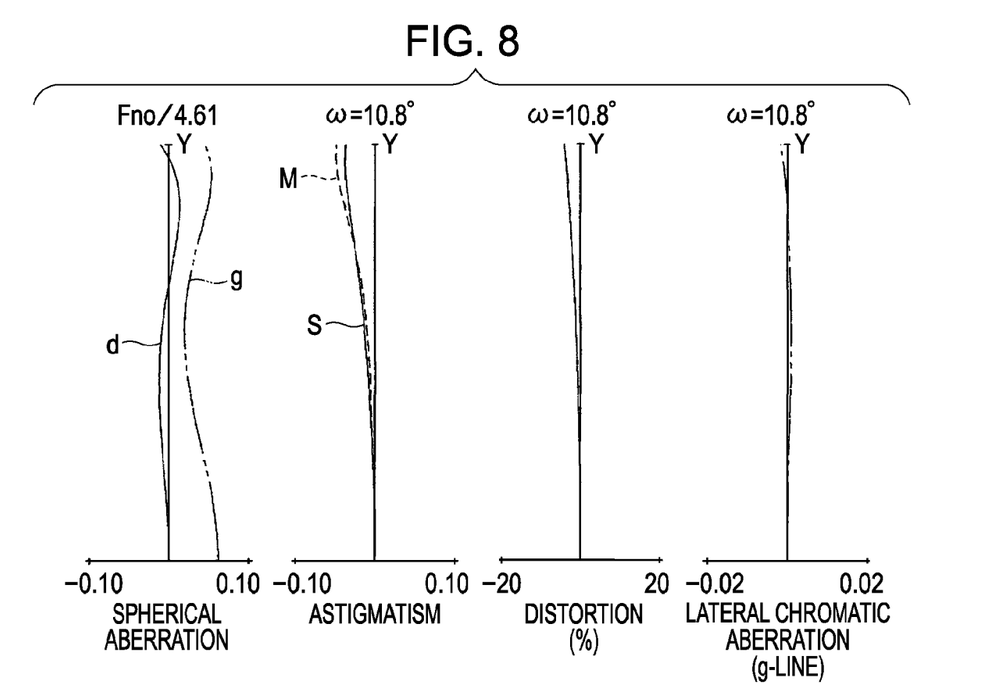
FIG. 8 illustrates an aberration diagram of the optical system according to the second exemplary embodiment at a telephoto end.

FIG. 5 illustrates a sectional view of an optical system according to a second exemplary embodiment of the present invention at a wide-angle end. Also in the second exemplary embodiment, the optical system is a zoom lens. FIGS. 6, 7, and 8 are aberration diagrams of the optical system according to the second exemplary embodiment at a wide-angle end, a middle zoom position, and a telephoto end, respectively.

Figure 9:
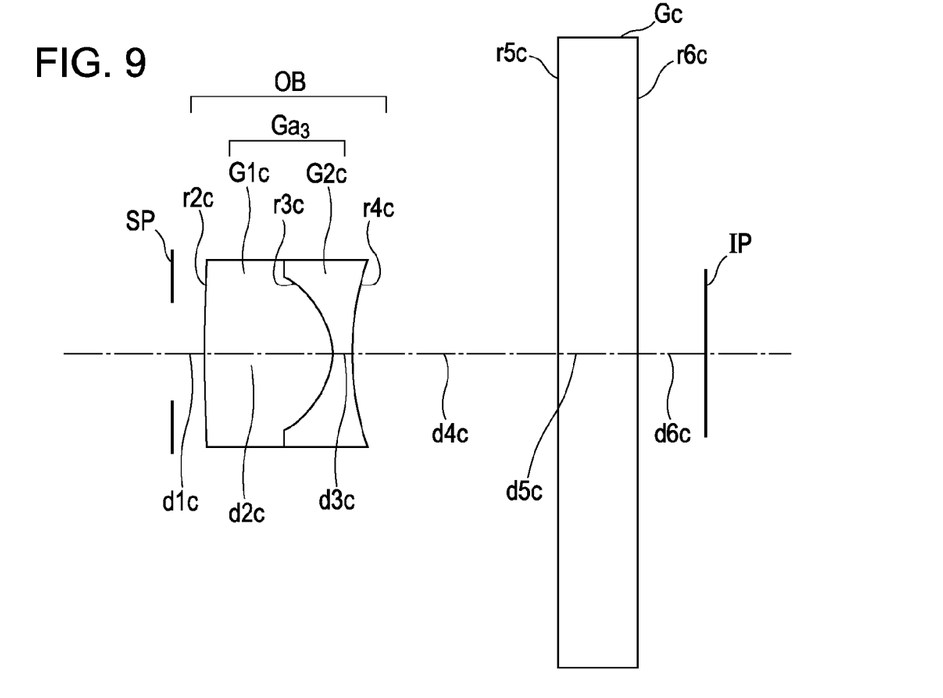
FIG. 9 illustrates a sectional view of an optical system according to a third exemplary embodiment of the present invention.
Figure 10:
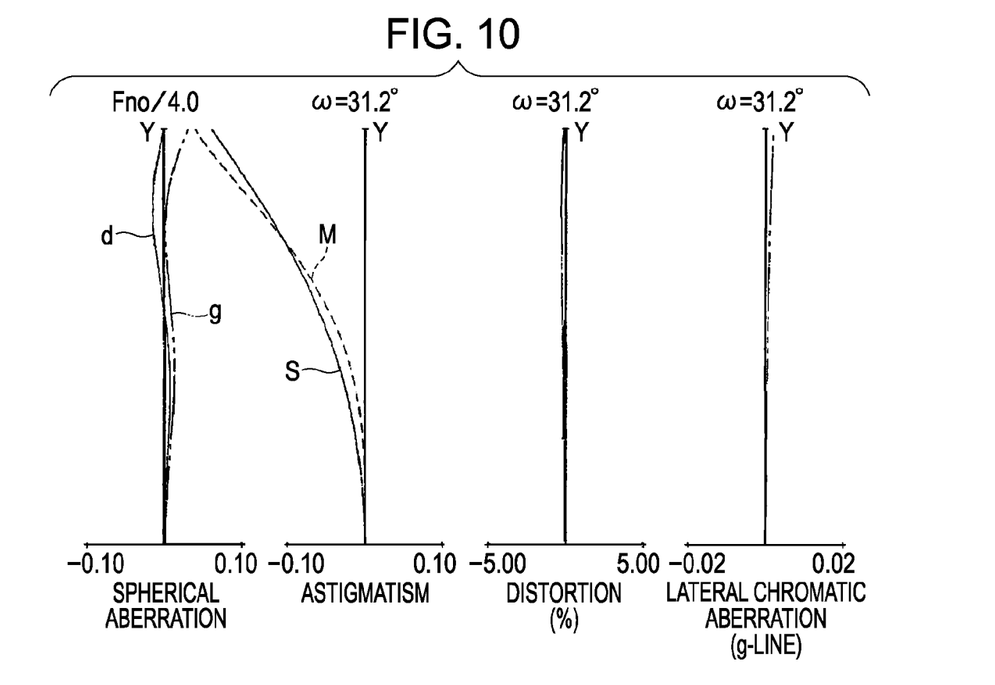
FIG. 10 illustrates an aberration diagram of the optical system according to the third exemplary embodiment.

FIG. 9 illustrates a sectional view of an optical system according to a third exemplary embodiment of the present invention. In the third exemplary embodiment, the optical system is an imaging lens with a single focal length. FIG. 10 is an aberration diagram of the optical system.

In the following description, the optical system according to the first and second exemplary embodiments are also referred to as zoom lenses and the optical system according to the third exemplary embodiment is also referred to as an imaging lens.

Figure 11:
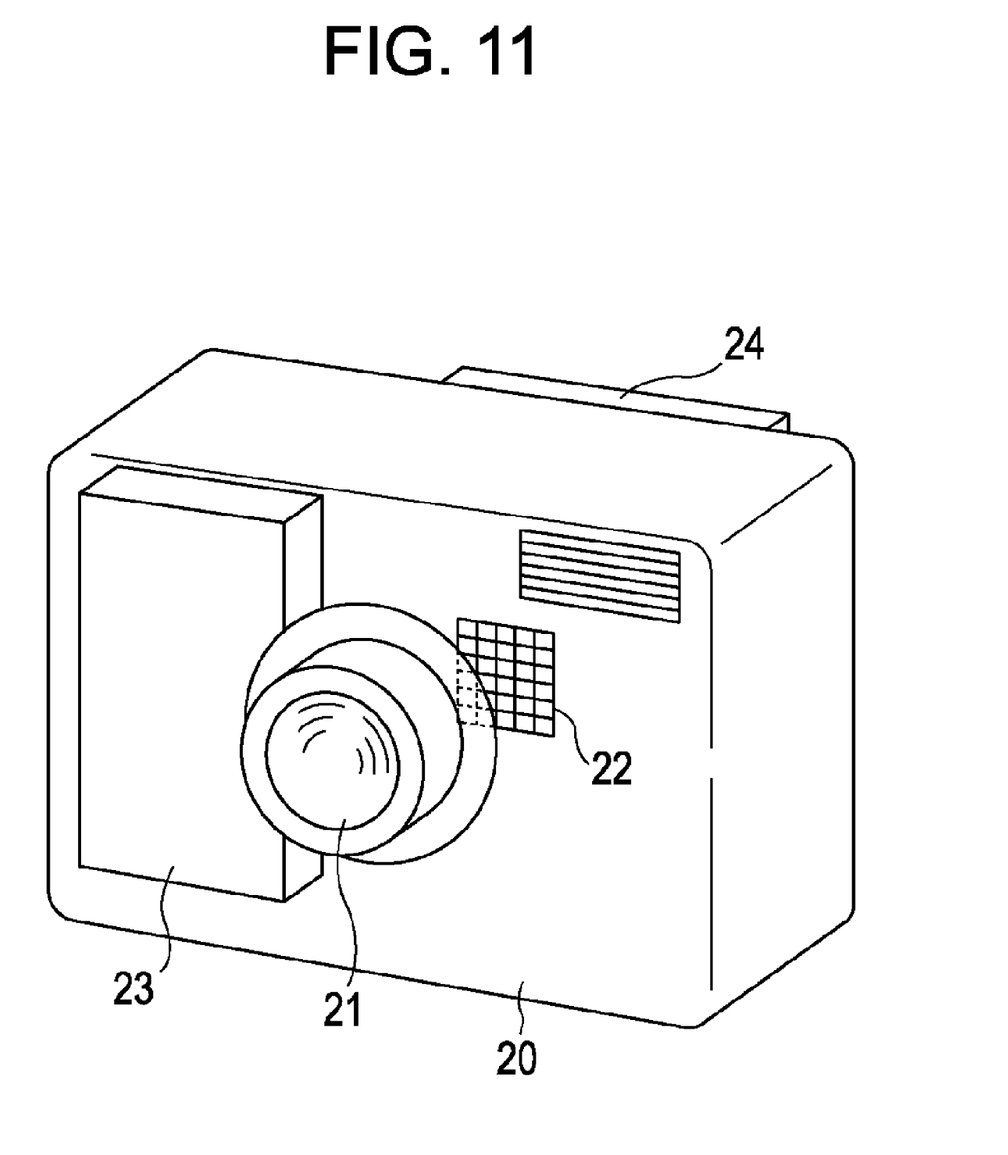
FIG. 11 illustrates a schematic diagram showing the major part of an image pickup apparatus according to an exemplary embodiment of the present invention.

FIG. 11 illustrates a schematic diagram showing the major part of an image pickup apparatus according to an exemplary embodiment of the present invention.

The optical systems according to the exemplary embodiments of the present invention can be used in image pickup apparatuses, such as digital cameras, video cameras, and film cameras, observing apparatuses, such as telescopes and binoculars, and in other optical apparatuses like copy machines and projectors and equivalents as known by one of ordinary skill in the relevant arts.

In the sectional views shown in FIGS. 1, 5, and 9, the left side shows the front (object side, magnifying side) and the right side shows the rear (image side, reducing side).

In the aberration diagrams, d and g indicate the d-line and the g-line, respectively, and M and S indicate a meridional image plane and a sagittal image plane, respectively. The lateral chromatic aberration is shown by the g-line. Fno indicates the F number, and ω indicates the half field angle and the Y-axis in the spherical aberration's graph is entrance pupil radius, the Y-axis in the astigmatism's, distortion's and chromatic aberration of magnification's graphs is image height.

In the sectional views shown in FIGS. 1 and 5, L1a-b denotes a first lens unit including a negative refractive power (optical power is the reciprocal of focal length), L2a-b denotes a second lens unit including a positive refractive power, and L3a-b denotes a third lens unit including a positive refractive power. SP denotes an aperture diaphragm that determines an on-axis marginal ray and that is disposed on an object side of the second lens unit L2a-b.

Ga-b denotes an optical block corresponding to, for example, an optical filter, a faceplate, a quartz low-pass filter, and an infrared-cut filter, and IP denotes an image plane. When the optical system is used as an imaging optical system of a video camera or a digital still camera, a photosensitive surface corresponding to an image pickup plane of a solid-state image pickup device (photoelectric converter), such as a charged coupled device (CCD) sensor and a metal-oxide semiconductor (CMOS) sensor, is placed on the image plane IP.

In the optical systems according to first and second exemplary embodiments, the wide-angle end and the telephoto end are zoom positions corresponding to the states in which the magnification-varying lens unit (second lens unit) is at one and the other ends of a moveable range on an optical axis.

In the optical systems according to the first and second exemplary embodiments, during zooming from the wide-angle end to the telephoto end, the first lens unit L1a-b substantially reciprocates (A1-A2) along a locus that is convex toward the image side, and the second lens unit L2 and the third lens unit L3 move (B1-B2, and C1-C2) toward the object side.

In the optical systems according to the first and second exemplary embodiments, magnification can be varied by moving (B1-B2) the second lens unit L2, and an image movement caused by the variation in magnification is compensated for by reciprocating (A1-A2) the first lens unit L1a-b and moving (C1-C2) the third lens unit L3a-b toward the object side.

Each of the optical systems according to the first and second exemplary embodiments includes a compound optical element including a lens element and a resin layer having optical characteristics different from those of the lens element. An interface between the lens element and the resin layer can be aspherical. The resin layer can include a curable resin that can be cured by heat or light.

More specifically, in each of the optical systems according to the first and second exemplary embodiments, the first lens unit L1a-b includes a compound optical element Ga1-2 including a single negative lens (lens element) G11a-b including concave lens surfaces on both sides thereof and a UV-curable resin layer G12a-b laminated on the image-side surface of the negative lens G11a-b.

An interface between the lens element G11a-b and the curable resin layer G12a-b can be aspherical.

The term "lens element" refers to an optical element like a glass lens, a plastic lens, that can serve as a substrate on which a resin layer can be laminated. The lens element can include a curable resin having optical characteristics different from those of the curable resin laminated on the lens element.

The second lens unit L2a-b includes a single positive lens including convex lens surfaces on both sides thereof and a single negative lens in order from the object side to the image side, the lenses being either separately formed or cemented together.

The third lens unit L3a-b includes a single positive lens.

The third lens unit L3a-b largely contributes to increase the total refractive power of the lens units when the size of the solid-state image pickup device is reduced.

In particular, since the refractive power of a short zoom system including the first and second lens units L1a-b and L2a-b is relatively reduced, the aberrations caused by lenses included in the first lens unit L1a-b can be reduced and good optical performance is obtained.

In addition, telecentric imaging on the image side required in the imaging apparatus including the solid-state image pickup device can be achieved since the third lens unit provides a function of a field lens.

In addition, the aperture diaphragm SP can be disposed at a position closest to the object side on the second lens unit L2a-b so that the distance between the entrance pupil and the first lens unit L1a-b at a wide-angle zoom position can be reduced. Accordingly, the chance of an increase of the outer diameter (effective diameter) of the lenses, included in the first lens unit L1a-b can be reduced. In addition, off-axis aberrations can be canceled or reduced by the first lens unit L1a-b and the third lens unit L3a-b between which the aperture diaphragm SP on the object side of the second lens unit L2a-b is disposed. As a result, good optical performance can be obtained without increasing the number of lenses.

In the sectional view shown in FIG. 9, SP denotes an aperture diaphragm and OB denotes a lens system with a single focal length.

Gc denotes an optical block corresponding to, for example, an optical filter, a faceplate, and IP denotes an image plane. When the optical system is used as an imaging optical system of a video camera or a digital still camera, a photosensitive surface corresponding to an image pickup plane of a solid-state image pickup device (photoelectric converter), such as a CCD sensor and a CMOS sensor, is placed on the image plane IP.

The optical system according to the third exemplary embodiment includes a compound optical element including a lens element and a curable resin layer having optical characteristics different from those of the lens element. The curable resin layer can be curable by heat or light and can be laminated on a surface of the lens element. An interface between the lens element and the resin layer can be aspherical.

More specifically, the optical system according to the third exemplary embodiment includes a compound optical element Ga3 including a single positive lens (lens element) G1 including convex lens surfaces on both sides thereof and a UV-curable resin layer G2 laminated on the image-side surface of the negative lens G1 in order from the object side.

In the optical system according to each of the above-described exemplary embodiments, in order to obtain good optical performance and/or to reduce the overall size of the lens system, at least one of the conditions described below can be satisfied.

That is, when Rref is a reference radius of curvature of the interface between the lens element and the resin layer within an effective diameter, L is a distance from the aperture diaphragm SP that determines the on-axis marginal ray to the interface along an optical axis in a state in which the focal length of the overall optical system is at a minimum (the zoom position at the wide-angle end in the first and second exemplary embodiments and the compound optical element Ga in the third exemplary embodiment), ndg and νdg are a refractive index and an Abbe number, respectively, of the material of the lens element at the d-line, ndj and νdj are a refractive index and an Abbe number, respectively, of the material of the resin layer at the d-line, θgF and θgd are partial dispersion ratios of the material of the resin layer, |dn/dT| is the absolute value of a rate of change in the refractive index of the material of the resin layer at the d-line with respect to the temperature within a temperature range of 0° C. to 40° C., φg is a refractive power of the lens element, and φj is a refractive power of the resin layer, one or more of the following conditions can be satisfied:

$$-1.5 < Rref/L < -0.3 \tag{1}$$

$$0.1 < |ndg - ndj| \tag{2a}$$

$$5 < |\nu dg - \nu dj| \tag{2b}$$

$$-2.100 \times 10^{-3} \cdot \nu dj + 0.693 < \theta gF \tag{3}$$

$$0.555 < \theta gF < 0.9 \tag{4}$$

$$-2.407 \times 10^{-3} \cdot \nu dj + 1.420 < \theta gd \tag{5}$$

$$1.255 < \theta gd < 1.67 \tag{6}$$

$$\nu dj < 60 \tag{7}$$

$$|dn/dT| < 2.5 \times 10^{-4} /° C. \tag{8}$$

$$-1.2 < \phi j / \phi g < 0 \tag{9}$$

The reference radius of curvature Rref is a radius of a spherical surface that passes through the vertex of an aspherical surface and each point on the effective diameter of the aspherical surface.

The sign of the distance L is negative when the interface is on the object side of the aperture diaphragm and is positive when the interface is on the image side of the aperture diaphragm.

The Abbe numbers and the partial dispersion ratios of the optical components are as below.

When the refractive indices at the g-line (wavelength 435.8 nm), the F-line (486.1 nm), the d-line (587.6 nm), and the C-line (656.3 nm), which are Fraunhofer lines, are $N_g$, $N_F$, $N_d$, and $N_C$, respectively, the Abbe number νd and the partial dispersion ratios θgd and θgF are defined similarly to common definitions as follows:

$$\nu d = (N_d - 1)/(N_F - N_C) \tag{10}$$

$$\theta gd = (N_g - N_d)/(N_F - N_C), \theta gF = (N_g - N_F)/(N_F - N_C) \tag{11}$$

Conditional Expression (1) relates to the reference radius of curvature of the aspheric interface between the lens element and the resin layer. When Conditional Expression (1) is satisfied, the shape of the aspherical surface is similar to a concentric circle centered on the point at which the optical axis intersects the aperture diaphragm SP, so that the off-axis aberrations generated mainly by the refraction of the off-axis chief ray can be suppressed.

When the value of Conditional Expression (1) is below the lower limit, the radius of curvature of the aspherical shape of the interface is too large with respect to the concentric circle centered on the point at which the optical axis intersects the aperture diaphragm SP. Therefore, distortion cannot be sufficiently corrected.

When the value of Conditional Expression (1) is above the upper limit, the radius of curvature of the aspherical shape of the interface is too small with respect to the concentric circle centered on the point at which the optical axis intersects the aperture diaphragm SP. Therefore, it can be difficult to correct the field curvature.

The numerical range of Conditional Expression (1) can also be set as follows:

$$-1.2 < Rref/L < -0.5 \tag{1a}$$

Conditional Expressions (2a) and (2b) are set for causing the aspherical surface of the interface to exhibit sufficient aberration-correcting effect.

When one or both of Conditional Expressions (2a) and (2b) are satisfied in addition to Conditional Expression (1), good optical performance can be obtained.

Conditional Expression (2a) relates to a difference in the refractive index at the d-line between the lens element and the resin layer. When the value of Conditional Expression (2a) is below the lower limit, sufficient refractive-index difference cannot be obtained at the interface. Therefore, the aberrations cannot be reliably corrected even when the aspherical surface is used.

The numerical range of Conditional Expression (2a) can also be set as follows:

$$0.13 < |ndg - ndj| \tag{2aa}$$

Conditional Expression (2b) relates to a difference in the Abbe number at the d-line between the lens element and the resin layer. When the value of Conditional Expression (2b) is below the lower limit, sufficient Abbe-number difference cannot be obtained at the interface. Therefore, the aberrations cannot be reliably corrected even when the aspherical surface is used.

The numerical range of Conditional Expression (2b) can also be set as follows:

$$10<|vdg-vdj|  \quad (2bb)$$

In the optical system of each exemplary embodiment, the resin layer having large (high) partial dispersion ratios provides refraction.

Accordingly, a refractive optical element (optical component) having an optical power can be composed of a resin having high partial dispersion ratios.

The compound optical element included in the optical system according to each exemplary embodiment has refracting surfaces on both an incident side and an emission side thereof, and at least one of the refracting surfaces has a power (refractive power). In addition, the resin layer included in the compound optical element can include a material that satisfies Conditional Expressions (3) and (4) when the Abbe number is vdj and the partial dispersion ratio is θgF.

When the resin layer that satisfies Conditional Expressions (3) and (4) is included in the optical system as a refractive optical element, the chromatic aberration can be reliably corrected over a wide wavelength range between the g-line and the C-line.

The effect of correcting the chromatic aberration can be further improved by setting the numerical range of Conditional Expression (3) as follows:

$$-2.100\times10^{-3}\cdot vdj+0.693<\theta gF<-1.231\times10^{-3}\cdot vdj+0.900 \quad (3a)$$

In addition, the numerical range of Conditional Expression (3) can also be set as follows:

$$-2.100\times10^{-3}\cdot vdj+0.693<vgF<-1.389\times10^{-3}\cdot vdj+0.823 \quad (3b)$$

In addition, the numerical range of Conditional Expression (3) can also be set as follows:

$$0.700<\theta gF<0.756 \quad (3c)$$

In addition to satisfying Conditional Expression (3), (3a), (3b), or (3c), when the numerical range of Conditional Expression (4) is set as below, the effect of correcting the chromatic aberration can be further improved.

$$0.555<\theta gF<0.86 \quad (4a)$$

In addition, the numerical range can also be set as follows:

$$0.555<\theta gF<0.80 \quad (4b)$$

The resin can also satisfy Conditional Expressions (5) and (6).

When Conditional Expressions (5) and (6) are satisfied, the chromatic aberration between the g-line and the d-line can be easily corrected. Accordingly, the chromatic aberration can be more reliably corrected in the wavelength range between the g-line and the C-line.

The effect of correcting the chromatic aberration can be improved by setting the numerical range of Conditional Expression (5) as follows:

$$-2.407\times10^{-3}\cdot vdj+1.420<\theta gd<-1.152\times10^{-3}\cdot vdj+1.651 \quad (5a)$$

In addition, the numerical range can also be set as follows:

$$-2.407\times10^{-3}\cdot vdj+1.420<\theta gd<-1.865\times10^{-3}\cdot vdj+1.572 \quad (5b)$$

In addition, the numerical range can also be set as follows:

$$1.426<\theta gd<1.512 \quad (5c)$$

In addition to satisfying Conditional Expression (5), (5a), (5b), or (5c), when the numerical range of Conditional Expression (6) is set as below, the effect of correcting the chromatic aberration can be improved.

$$1.255<\theta gd<1.61 \quad (6a)$$

In addition, the numerical range can also be set as follows:

$$1.255<\theta gd<1.54 \quad (6b)$$

In addition, in view of chromatic aberration correction, the material of the resin layer can be a solid material that satisfies Conditional Expression (7).

The effect of correcting the chromatic aberration can be further improved by setting the numerical range of Conditional Expression (7) as follows:

$$vdj<45 \quad (7a)$$

In addition, the numerical range can also be set as follows:

$$vdj<30 \quad (7b)$$

In addition, when |dn/dT| is the absolute value of the rate of change in the refractive index of the material of the resin layer at the d-line with respect to the temperature within the temperature range of 0° C. to 40° C., Conditional Expression (8) can be satisfied.

When the value of Conditional Expression (8) is out of the given range, it is difficult to ensure good optical performance in the temperature range of 0° C. to 40° C.

Conditional Expression (9) relates to the refractive-power ratio between the lens element and the resin layer included in the compound optical element Ga1-3.

When the value of Conditional Expression (9) is below the lower limit, the refractive power of the resin layer is too high. Therefore, the thickness of the resin can be increased and the resin-forming process is difficult.

When the value of Conditional Expression (9) is above the upper limit, the aberration-correcting effect obtained by the resin layer is reduced.

The numerical range of Conditional Expression (9) can also be set as follows:

$$-1.0<\phi j/\phi g<-0.1 \quad (9a)$$

There are various kinds of resins that satisfy Conditional Expressions (3) and (4). In particular, UV-curable resin (Nd=1.635, vd=22.7, θgF=0.69) and N-polyvinylcarbazole (Nd=1.696, vd=17.7, θgF=0.69) are optical materials that satisfy Conditional Expressions (3) and (4) and these represent some non-limiting examples of applicable material that can be used.

The resin is not limited to the above-mentioned resins as long as Conditional Expressions (3) and (4) can be satisfied.

As an example of the optical material having characteristics different from those of common glass material, a compound in which inorganic oxide nanoparticles are dispersed into a synthetic resin can be used. The inorganic oxide nanoparticles are, for example, $TiO_2$ (Nd=2.304, vd=13.8), $Nb_2O_5$ (Nd=2.367, vd=14.0), ITO (Nd=1.8581, vd=5.53), $Cr_2O_3$ (Nd=2.2178, vd=13.4), $BaTiO_3$ (Nd=2.4362, vd=11.3).

Among the inorganic oxides, when, for example, particles of $TiO_2$ (Nd=2.304, vd=13.8, θgF=0.87) are dispersed in the synthetic resin at an adequate volume ratio, an optical material that satisfies Conditional Expressions (3) and (4) can be obtained.

$TiO_2$ is a material used for various applications, and is used as, for example, a deposition material for forming an optical film, such as an antireflection film, in the field of optics. $TiO_2$ is also used as photocatalyst, white pigment, and $TiO_2$ particles are used as a cosmetic material.

In each exemplary embodiment, the average diameter of the $TiO_2$ particles dispersed in the resin can be set to about 2 nm to 50 nm when the influence of scattering is taken into account, and dispersant can be used to prevent or reduce aggregation.

Polymer can be used as the medium into which the $TiO_2$ particles are dispersed, and high mass productivity can be provided by photopolymerization forming or thermal polymerization forming using a forming die.

In addition, with regard to the characteristics of optical constant, a polymer including a relatively high partial dispersion ratio, a polymer including a relatively low Abbe number, or a polymer including both a relatively high partial dispersion ratio and a relatively low Abbe number can be used.

For example, N-polyvinylcarbazole, styrene, polymethylmethacrylate (acryl), or other polymers as known by one of ordinary skill can be used.

In the exemplary embodiments described below, UV-curable resin and N-polyvinylcarbazole are used as host polymer in which the $TiO_2$ particles are dispersed. However, the present invention is not limited to this.

The dispersion characteristic $N(\lambda)$ of the compound in which nanoparticles are dispersed can be easily calculated by the following equation, which is derived by the Drude equation, which is commonly known. More specifically, the refractive index $N(\lambda)$ at a wavelength $\lambda$ can be calculated as follows:

$$N(\lambda)=[1+V\{N_{TiO}^2(\lambda)-1\}+(1-V)\{N_P^2(\lambda)-1\}]^{1/2} \qquad (12)$$

where $\lambda$ is an arbitrary wavelength, $N_{TiO}$ is the refractive index of $TiO_2$, $N_P$ is the refractive index of the polymer, V is the ratio of the total volume of the $TiO_2$ particles with respect to the volume of the polymer.

In each of the exemplary embodiments, the resin layer composed of a material that satisfies Conditional Expressions (3) and (4) is used as a layer (surface) of the optical element having a refractive power.

In addition, the interface between the optical element and the resin layer is aspherical, and chromatic aberration flare, such as chromatic spherical aberration, is reliably corrected.

The interface can be formed between the resin and the atmosphere, such as air, or between the resin and an optical material having a relatively low refractive index. In such a case, the chromatic aberration can be relatively largely varied with a small variation in the curvature of the interface.

Table 2 shows the optical constant values of optical materials used in examples of the exemplary embodiments (UV-curable resin 1, material in which $TiO_2$ particles are dispersed, and N-polyvinylcarbazole), and Table 3 shows the optical constant values of UV-curable resin 2 and $TiO_2$ included in the material in which $TiO_2$ particles are dispersed.

Next, numerical data of first to third numerical examples corresponding to examples of the first to third exemplary embodiments, respectively, will be described. In each numerical example, i indicates the number counted from the object side, ri indicates the radius of curvature of the $i^{th}$ optical surface ($i^{th}$ surface), di indicates the distance between the $i^{th}$ and $(i+1)^{th}$ lens surfaces on the optical axis, and ni and vi indicate the refractive index and the Abbe number, respectively, of the $i^{th}$ optical component at the d-line.

The two surfaces nearest to the image side form an optical block, such as a filter and a faceplate.

In addition, f is the focal length, Fno is the F number, and $\omega$ is the half field angle.

When X is the displacement from the surface vertex along the optical axis, h is the height of from the optical axis in a direction perpendicular to the optical axis, r is the paraxial radius of curvature, k is the conic constant, and B and C are the aspherical coefficients, the shape of the aspherical surface is expressed as follows:

$$x(h) = \frac{(1/r)h^2}{1+\sqrt{\{1-(1+k)(h/r)^2\}}} + Bh^4 + Ch^6$$

In the aspherical coefficients, "e±XX" indicates "×$10^{\pm XX}$."

Table 1 shows the relationship between Conditional Expressions and the exemplary embodiments.

The optical system according to the first numerical example is a zoom lens having a zoom ratio of 2.8 and an opening ratio of about 3.3 to 5.0.

In the first numerical example, a compound optical element is used as the first lens unit L1 and UV-curable resin 1 is used as the resin.

The optical system according to the second numerical example is a zoom lens having a zoom ratio of 2.8 and an opening ratio of about 2.9 to 4.6.

In the second numerical example, a compound optical element is used as the first lens unit L1 and N-polyvinylcarbazole is used as the resin.

The optical system according to the third numerical example is an imaging lens having an opening ratio of about 4.0.

In the third numerical example, the optical system is composed only of the compound optical element and $TiO_2$ 3%—UV-curable resin 2 is used as the resin.

NUMERICAL EXAMPLE 1

| f = 6.591 to 18.651, Fno = 3.26 to 5.04, 2ω = 56.6° to 21.6° | | | |
|---|---|---|---|
| R1 = −8.116 | D1 = 0.70 | N1 = 1.48749 | vd1 = 70.2 |
| R2 = 10.415 | D2 = 0.30 | N2 = 1.63555 | vd2 = 22.7 |
| R3 = 17.645 | D3 = variable | | |
| R4 = diaphragm | D4 = −0.40 | | |
| R5 = 4.038 | D5 = 1.80 | N3 = 1.80100 | vd3 = 35.0 |
| R6 = −20.533 | D6 = 0.20 | | |
| R7 = 42.450 | D7 = 0.50 | N4 = 1.92286 | vd4 = 18.9 |
| R8 = 4.349 | D8 = variable | | |
| R9 = 70.951 | D9 = 1.30 | N5 = 1.77250 | vd5 = 49.6 |
| R10 = −15.868 | D10 = variable | | |
| R11 = ∞ | D14 = 1.30 | N6 = 1.51633 | vd6 = 64.1 |
| R12 = ∞ | | | |

|   | f |   |   |
|---|---|---|---|
| D | 6.591 | 12.258 | 18.651 |
| D3 | 12.04 | 4.35 | 0.89 |
| D8 | 5.23 | 6.65 | 6.53 |
| D10 | 4.22 | 8.11 | 13.55 |

| Aspherical Coefficients | | | |
|---|---|---|---|
| R1: | k = −2.45470e+00 | B = 2.40366e−04 | C = −2.00042e−07 |
| R2: | k = 2.04972e+00 | B = −8.55954e−05 | C = 1.27083e−05 |
| R3: | k = 1.03182e+01 | B = 1.37505e−04 | C = 6.12849e−06 |
| R5: | k = −2.88269e+00 | B = 5.09961e−03 | C = −1.22449e−04 |
| R8: | k = −3.11010e+00 | B = 8.60077e−03 | C = 2.82336e−04 |
| R9: | k = 0.00000e+00 | B = 2.78356e−04 | C = −1.41086e−06 |

NUMERICAL EXAMPLE 2

| f = 6.590 to 18.640, Fno = 2.94 to 4.61, 2ω = 56.6° to 21.6° | | | |
|---|---|---|---|
| R1 = −9.362 | D1 = 0.60 | N1 = 1.48749 | vd1 = 70.2 |
| R2 = 13.690 | D2 = 0.35 | N2 = 1.69591 | vd2 = 17.7 |
| R3 = 20.719 | D3 = variable | | |
| R4 = diaphragm | D4 = 0.15 | | |
| R5 = 5.061 | D5 = 2.50 | N3 = 1.76200 | vd3 = 40.1 |
| R6 = −2.375 | D6 = 0.50 | N4 = 1.69895 | vd4 = 30.1 |
| R7 = 7.763 | D7 = variable | | |
| R8 = 10.445 | D8 = 1.40 | N5 = 1.77250 | vd5 = 49.6 |
| R9 = 16.994 | D9 = variable | | |
| R10 = ∞ | D10 = 1.00 | N6 = 1.51633 | vd6 = 64.1 |
| R11 = ∞ | | | |

|   | f |   |   |
|---|---|---|---|
| D | 6.590 | 13.155 | 18.640 |
| D3 | 13.47 | 3.52 | 0.89 |
| D7 | 8.15 | 8.91 | 11.70 |
| D9 | 0.92 | 4.79 | 6.64 |

| Aspherical Coefficients | | | |
|---|---|---|---|
| R1: | k = 3.89310e−01 | B = 4.37755e−04 | C = 1.92683e−06 |
|     | D = 6.33555e−09 | | |
| R2: | k = −3.79455e+00 | B = 3.26079e−04 | C = −1.97275e−06 |
| R3: | k = −2.67610e−01 | B = 1.64690e−04 | C = 4.35733e−06 |
| R5: | k = 1.80938e−02 | B = 1.20823e−05 | C = 2.40546e−05 |
| R6: | k = −2.46679e+00 | B = −3.36766e−03 | C = 3.18762e−04 |
| R7: | k = 1.69997e+00 | B = 1.40072e−03 | C = 2.56727e−04 |
| R8: | k = 0.00000e+00 | B = 8.51454e−05 | C = 3.35662e−07 |

NUMERICAL EXAMPLE 3

| f = 5.860, Fno = 4.00, 2ω = 62.4° | | | |
|---|---|---|---|
| R1 = diaphragm | D1 = 0.50 | | |
| R2 = 12.033 | D2 = 2.00 | N1 = 1.80400 | vd1 = 46.6 |
| R3 = −1.076 | D3 = 0.30 | N2 = 1.55324 | vd2 = 39.8 |
| R4 = 4.304 | D4 = 1.00 | | |
| R5 = ∞ | D5 = 1.30 | N3 = 1.51633 | vd3 = 64.1 |
| R6 = ∞ | | | |

| Aspherical Coefficients | | | |
|---|---|---|---|
| R2: | k = −3.65363e+02 | B = 3.74430e−03 | C = −1.96470e−02 |
| R3: | k = −4.45291e−01 | B = 2.95874e−02 | C = 5.22699e−03 |
| R4: | k = 1.05082e+00 | B = −2.82523e−03 | C = 6.24570e−04 |

TABLE 1

| Conditional Expression | | Upper Limit | Upper Limit | 1st Example | 2nd Example | 3rd Example |
|---|---|---|---|---|---|---|
| (1) | Rref |   |   | 9.489 | 13.041 | −1.307 |
|     | L |   |   | −12.338 | −13.820 | 2.500 |
|     | Rref/L | −1.5 | −0.3 | −0.769 | −0.944 | −0.523 |
|     | ndg |   |   | 1.48749 | 1.48749 | 1.80400 |
|     | vdg |   |   | 70.2 | 70.2 | 46.6 |
|     | ndj |   |   | 1.63555 | 1.69591 | 1.55324 |
| (7) | vdj |   |   | 22.7 | 17.7 | 39.8 |
| (2a) | \|ndg − ndj\| | 0.1 |   | 0.14806 | 0.20842 | 0.25076 |
| (2b) | \|vdg − vdj\| | 5.0 |   | 47.5 | 52.6 | 6.8 |
| (9) | φj |   |   | 0.025 | 0.018 | −0.656 |
|     | φg |   |   | −0.108 | −0.088 | 0.759 |
|     | φj/φg | −1.2 | 0.0 | −0.235 | −0.199 | −0.864 |

TABLE 2

|  | UV-Curable Resin 1 | N-polyvinylcarbazole | Tio$_2$3%-UV-Curable Resin 2 |
| --- | --- | --- | --- |
| Refractive Index at d-Line | 1.63555 | 1.69591 | 1.55324 |
| Refractive Index at g-Line | 1.67532 | 1.75164 | 1.57249 |
| Refractive Index at C-Line | 1.62807 | 1.68528 | 1.54936 |
| Refractive Index at F-Line | 1.65604 | 1.72465 | 1.56326 |
| vd | 22.7 | 17.7 | 39.8 |
| θgd | 1.422 | 1.415 | 1.385 |
| θgF | 0.689 | 0.686 | 0.665 |

TABLE 3

|  | UV-Curable Resin 2 | TiO$_2$ |
| --- | --- | --- |
| Refractive Index at d-Line | 1.52415 | 2.30377 |
| Refractive Index at g-Line | 1.53706 | 2.45676 |
| Refractive Index at C-Line | 1.52116 | 2.28032 |
| Refractive Index at F-Line | 1.53133 | 2.37452 |
| vd | 51.6 | 13.8 |
| θgd | 1.269 | 1.624 |
| θgF | 0.563 | 0.873 |

Next, a digital camera (image pickup apparatus) including the optical system according to an exemplary embodiment of the present invention as an imaging optical system will be described below with reference to FIG. 11.

With reference to FIG. 11, the digital camera includes a camera body 20; an imaging optical system 21 including the optical system according to an exemplary embodiment of the present invention; a solid-state image pickup device (photoelectric converter) 22, such as a CCD, that receives an object image formed by the imaging optical system 21; a memory 23 that records information corresponding to the object image received by the image-pickup device 22; and a finder 24 for observing the object image displayed on a display unit (not shown).

The display unit includes a display panel (e.g., liquid crystal) and displays the object image formed on the image-pickup device 22.

Thus, a small, high-optical-performance image pickup apparatus, such as a digital camera, can be obtained by using the optical system according to the exemplary embodiment of the present invention.

In the optical system according to the present exemplary embodiment, when a large distortion occurs, the distortion can be corrected using a known electrical aberration correcting method.

When the elements are set as described above, an optical system that includes a compound optical element having high environment resistance, that can be easily manufactured, that can reliably correct aberrations including chromatic aberration, and that is suitable for use in an imaging system including a solid-state image pickup device can be obtained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-255117 filed Sep. 2, 2005, which is hereby incorporated by reference herein in its entirety.

What is claimed is:

1. An optical system comprising:
   a compound optical element including a lens element and a resin layer having optical characteristics different from optical characteristics of the lens element and provided on a surface of the lens element,
   wherein an interface between the lens element and the resin layer is aspherical, and
   wherein, when Rref is a reference radius of curvature of the interface within an effective diameter, L is a distance from a diaphragm, which determines an on-axis marginal ray, to the interface along an optical axis in a state in which a focal length of the overall optical system is at a minimum, ndg is a refractive index of a material of the lens element at the d-line, and ndj is a refractive index of a material of the resin layer at the d-line, the following expressions are satisfied:

$-1.5 < Rref/L < -0.3$ $0.1 < |ndg - ndj|.$

2. The optical system according to claim 1, wherein, when θgF is a partial dispersion ratio of the material of the resin layer and vdj is an Abbe number of the material of the resin layer at the d-line, the following expressions are satisfied:

$-2.100 \times 10^{-3} \cdot vdj + 0.693 < \theta gF$ $0.555 < \theta gF < 0.9.$ 3. The optical system according to claim 1, wherein, when θgd is a partial dispersion ratio of the material of the resin layer and vdj is an Abbe number of the material of the resin layer at the d-line, the following expressions are satisfied:

$-2.407 \times 10^{-3} \cdot vdj + 1.420 < \theta gd$ $1.255 < \theta gd < 1.67.$ 4. The optical system according to claim 1, wherein, when θdj is an Abbe number of the material of the resin layer at the d-line, the following expression is satisfied:

$vdj < 60.$

5. The optical system according to claim 1, wherein the material of the resin layer is a compound in which inorganic particles are dispersed in a transparent medium.

6. The optical system according to claim 1, wherein, when |dn/dT| is the absolute value of a rate of change in the refractive index of the material of the resin layer at the d-line with respect to the temperature in a temperature range of 0° C. to 40° C., the following expression is satisfied:

$|dn/dT| < 2.5 \times 10^{-4}/°C.$

7. The optical system according to claim 1, wherein, when ϕg is a refractive power of the lens element, and ϕj is a refractive power of the resin layer, the following expression is satisfied:

$-1.2 < \phi j/\phi g < 0.$

8. The optical system according to claim 1, wherein the optical system forms an image on a photoelectric converter.

9. An image pickup apparatus comprising:
an optical system according to claim 1; and
a photoelectric converter receiving an image formed by the optical system.

10. An optical system comprising:
a compound optical element including a lens element and a resin layer having optical characteristics different from optical characteristics of the lens element and provided on a surface of the lens element,
wherein an interface between the lens element and the resin layer is aspherical, and
wherein, when Rref is a reference radius of curvature of the interface within an effective diameter, L is a distance from a diaphragm, which determines an on-axis marginal ray, to the interface along an optical axis in a state in which a focal length of the overall optical system is at a minimum, νdg is an Abbe number of a material of the lens element at the d-line, and νdj is an Abbe number of a material of the resin layer at the d-line, the following expressions are satisfied:

$-1.5 < Rref/L < -0.3$ $5 < |\nu dg - \nu dj|$.

11. The optical system according to claim 10, wherein, when θgF is a partial dispersion ratio of the material of the resin layer, the following expressions are satisfied:

$-2.100 \times 10^{-3} \cdot \nu dj + 0.693 < \theta gF$ $0.555 < \theta gF < 0.9$.

12. The optical system according to claim 10, wherein, when θgd is a partial dispersion ratio of the material of the resin layer, the following expressions are satisfied:

$-2.407 \times 10^{-3} \cdot \nu dj + 1.420 < \theta gd$ $1.255 < \theta gd < 1.67$.

13. The optical system according to claim 10, wherein the Abbe number θdj of the material of the resin layer at the d-line satisfies the following expression:

$\theta dj < 60$.

14. The optical system according to claim 10, wherein the material of the resin layer is a compound in which inorganic particles are dispersed in a transparent medium.

15. The optical system according to claim 10, wherein, when |dn/dT| is the absolute value of a rate of change in the refractive index of the material of the resin layer at the d-line with respect to the temperature in a temperature range of 0° C. to 40° C., the following expression is satisfied:

$|dn/dT| < 2.5 \times 10^{-4} /° C$.

16. The optical system according to claim 10, wherein, when φg is a refractive power of the lens element, and φj is a refractive power of the resin layer, the following expression is satisfied:

$-1.2 < \phi j/\phi g < 0$.

17. The optical system according to claim 10, wherein the optical system forms an image on a photoelectric converter.

18. An image pickup apparatus comprising:
an optical system according to claim 10; and
a photoelectric converter receiving an image formed by the optical system.

* * * * *